United States Patent [19]
Williams et al.

[11] Patent Number: 5,832,388
[45] Date of Patent: Nov. 3, 1998

[54] PORTABLE RADIOTELEPHONE DEVICE ADAPTED TO RECEIVE A VARIETY OF OTHER PORTABLE DEVICES

[75] Inventors: Daniel L. Williams, Vernon Hills; Shrirang Nilkanth Jambhekar, Palatine; Nicholas Mischenko, Mt. Prospect, all of Ill.

[73] Assignee: Motorola, Inc., Schaumburg, Ill.

[21] Appl. No.: 775,662

[22] Filed: Dec. 31, 1996

[51] Int. Cl.$^6$ ................ H04Q 7/32; H04Q 7/20
[52] U.S. Cl. ............ 455/557; 455/425; 455/575
[58] Field of Search .................... 455/557, 550, 455/128, 351, 566, 343, 127, 90, 425, 575

[56] References Cited

U.S. PATENT DOCUMENTS

| | | |
|---|---|---|
| 5,220,269 | 6/1993 | Chen et al. . |
| 5,335,276 | 8/1994 | Thompson et al. . |
| 5,336,984 | 8/1994 | Mischenko et al. . |
| 5,346,784 | 9/1994 | Scheid . |
| 5,363,030 | 11/1994 | Ford et al. . |
| 5,369,565 | 11/1994 | Chen et al. . |
| 5,414,596 | 10/1993 | Eaton et al. . |
| 5,436,088 | 5/1994 | Castaneda et al. . |
| 5,698,964 | 10/1995 | Kates et al. . |

FOREIGN PATENT DOCUMENTS

| | | |
|---|---|---|
| 0521609A2 | 1/1993 | European Pat. Off. . |

Primary Examiner—Dwayne D. Bost
Assistant Examiner—Linwood C. Scott, Jr.
Attorney, Agent, or Firm—Keith D. Kaschke

[57] ABSTRACT

A portable radiotelephone device (100) comprises a radio housing (114) having radiotelephone circuitry (1102), a battery housing (110) having a battery (1104) and an accessory housing (1100) having accessory circuitry (1106). A first latch mechanism (116) secures the battery housing (1100) to the radio housing (114) to permit the battery (1104) to power the radiotelephone circuitry (1102) via a first pair of conductive power contacts (1108, 1110). A second latch mechanism (118) secures the accessory housing (1100) to the battery housing (110) to permit the battery (1104) to power the accessory circuitry (1106) via a second pair of conductive power contacts (112, 1112). Alternatively, a first pair of conductive data signal contacts (1116, 1118) between the radio housing (114) and the battery housing (110) and a second pair of conductive data signal contacts (1120, 1122) between the battery housing (110) and the accessory housing (1100) permit data signals to be passed between the radiotelephone circuitry (1102) and the accessory circuitry (1106). Alternatively, a mechanical device (812) having no electrical function is interchangeable with the accessory housing (1100) to be releasably secured to the battery housing (110).

20 Claims, 8 Drawing Sheets

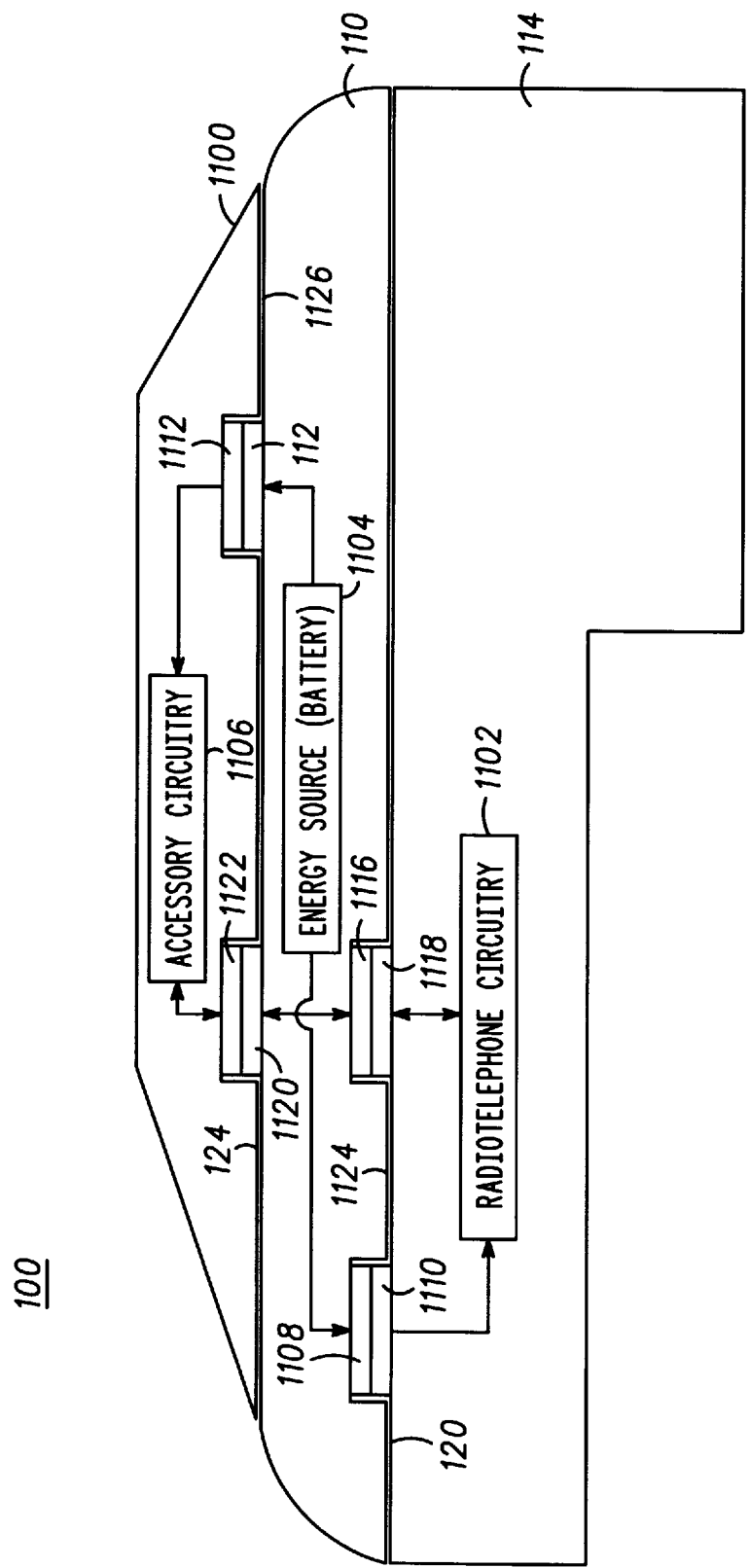

PORTABLE RADIOTELEPHONE DEVICE ADAPTED TO RECEIVE A VARIETY OF OTHER PORTABLE DEVICES

FIELD OF THE INVENTION

The present invention relates generally to portable radiotelephone devices, and more particularly to a portable radiotelephone device adapted to receive a variety of other portable devices.

BACKGROUND OF THE INVENTION

Communication devices such as radios including radiotelephones and radio pagers are well known in the art. Communication devices of this type provide users of the devices with wireless communications by transmitting and/ or receiving signals.

Presently, radiotelephones and radio pagers have gained widespread acceptance in the marketplace. The widespread acceptance is evidenced by the number of devices sold in the marketplace and the frequency of use of the devices as measured by the charges billed by the system providers. Factors contributing to this widespread acceptance includes lower product price, increased product performance, expanded radio service area, more mobile user lifestyle, safety considerations, smaller devices, lighter devices, etc.

Other electronic devices have also made significant advances in the areas of price, performance, service area, portability, safety, size, weight, etc. These other electronic devices include, for example, calculators, personal alarms, electronic note pads, AM/FM or cassette stereo devices, flash lights, radio frequency modems, global positioning satellite (GPS) receivers, messaging boards, home security control devices, garage door controllers, fax machines, still cameras, and video cameras.

While present day consumers enjoy the convenience and use of these different portable electronic devices, many problems occur when the user intends to carry and operate multiple portable electronic devices. One problem is that each device operates off of its own battery. Maintaining a variety of different battery types for a variety of different portable electronic devices is cumbersome and inconvenient for the user. Many people can identify with the finding of a "dead" battery in one of their portable electronic devices. Another problem is transporting several portable electronic devices at one time. The more devices the user is transporting the greater the opportunity there is for one of the devices to be dropped or lost. Still another problem is convenient operation of the multiple portable electronic devices by a user. For the user to switch between the use of one device and another, the user typically needs to exchange the different devices in the same hand, store one device and find the other device, power on/off each device, etc. This activity is inconvenient for the user and increases the possibility that one device will be dropped.

Accordingly, there is a need for a portable radiotelephone device adapted to electrically and mechanically receive a variety of other portable electronic devices which overcomes the multiple problems encountered when a user intends to carry and operate a portable communication device as well as other portable electronic devices.

BRIEF DESCRIPTION OF THE DRAWINGS

FIG. 11 is a cross sectional view of a radio housing, a power supply housing and an accessory housing mechanically latched together and having conductive power contacts and conductive data signal contacts.

DETAILED DESCRIPTION OF THE PREFERRED EMBODIMENTS

Figure 1:
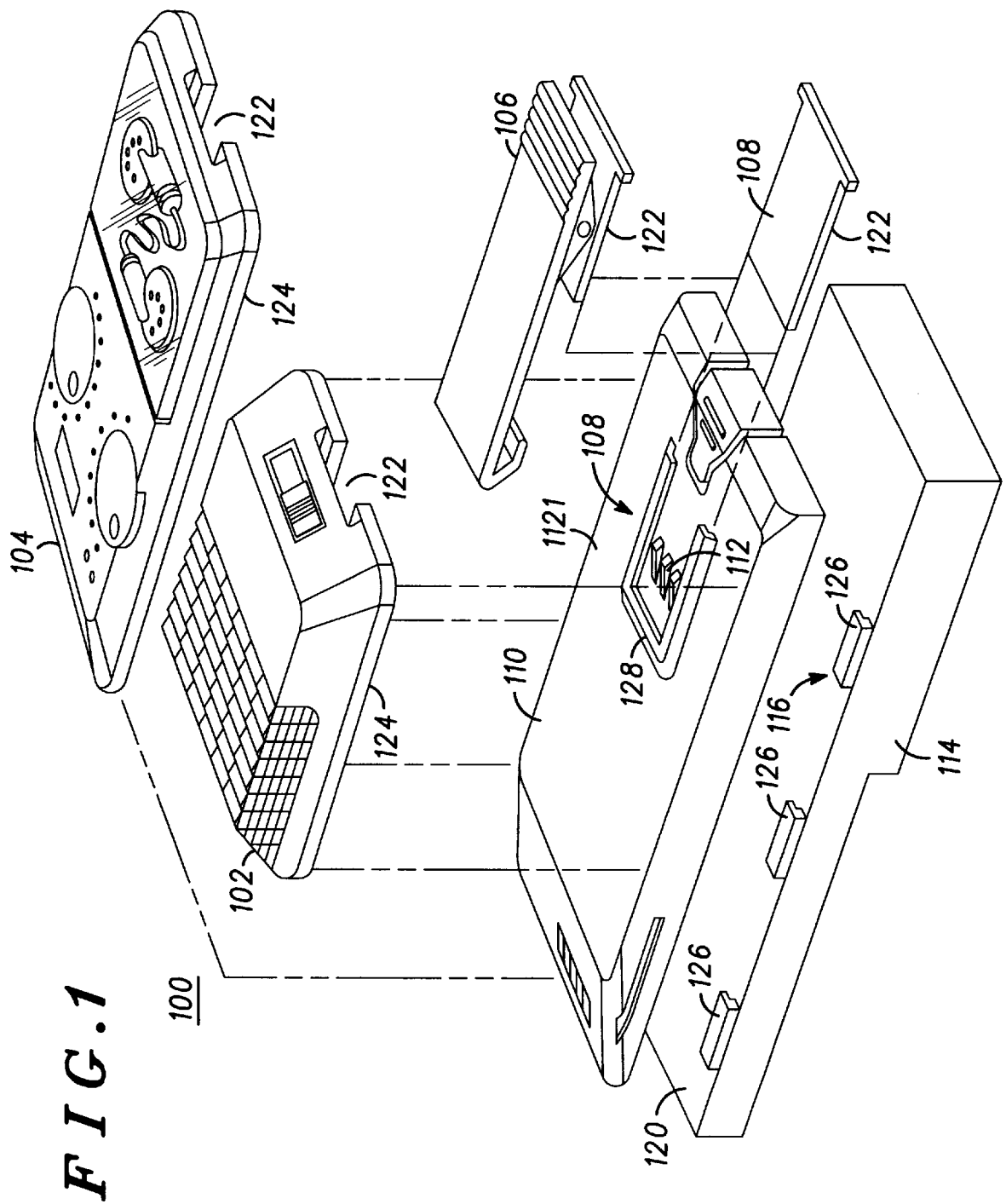
FIG. 1 is a right side, top side and rear side perspective view of two electrical devices and two mechanical devices, which do not have an electrical function, adapted to be interchangeably and releasably secured to a power supply housing having conductive power contacts.
Figure 2:
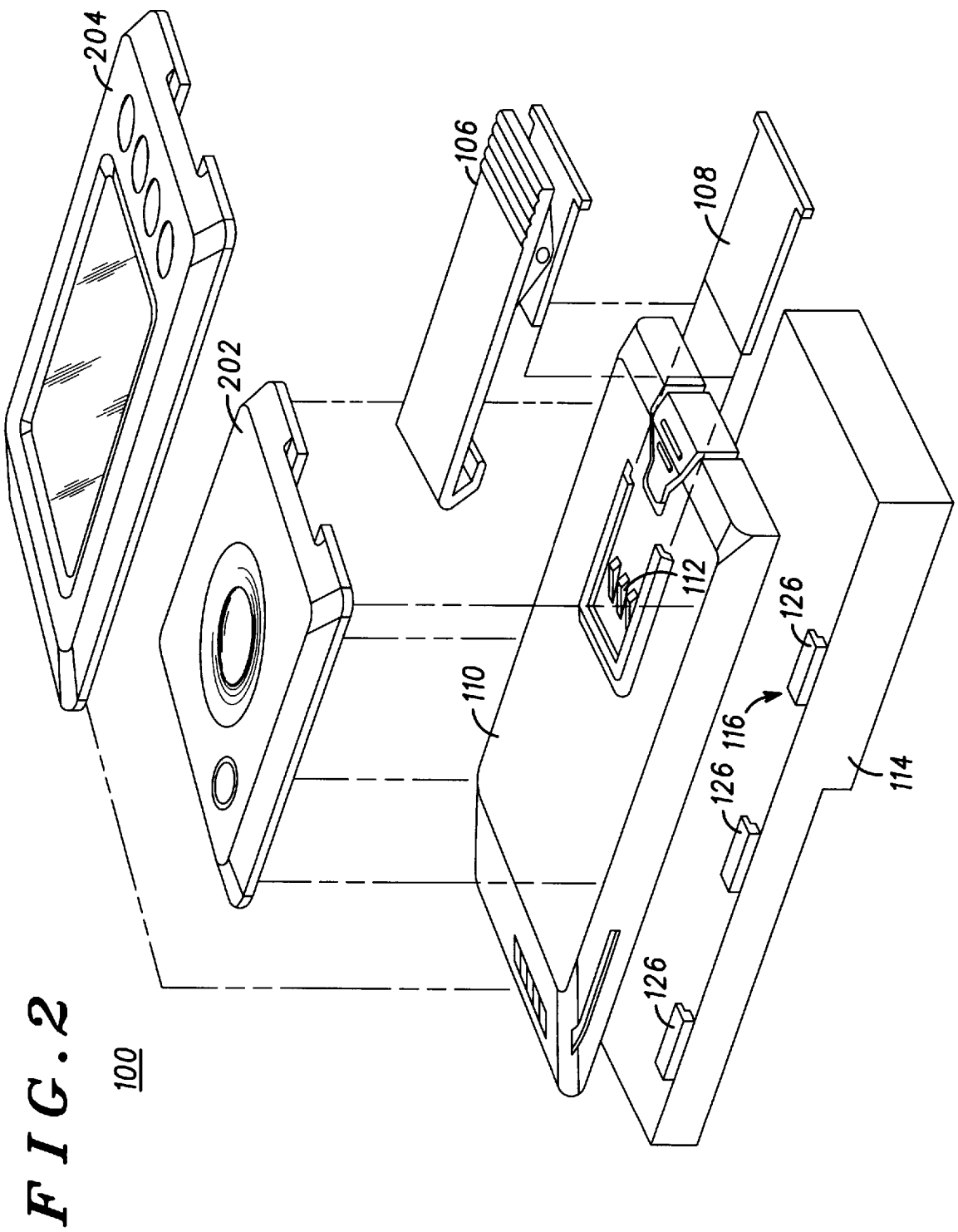
FIG. 2 is a right side, top side and rear side perspective view of two additional electrical devices and two mechanical devices, which do not have an electrical function, adapted to be interchangeably and releasably secured to a power supply housing having conductive power contacts.

Referring to FIGS. 1, 2 and 11 together, FIG. 1 is a right side, top side and rear side perspective view of a portable radiotelephone device 100 having two electrical devices 102 and 104 and two mechanical devices 106 and 108, which do not have an electrical function, adapted to be interchangeably and releasably secured to a power supply housing 110 having conductive power contacts 112. FIG. 2 is a right side, top side and rear side perspective view of a the portable radiotelephone device 100 having two additional electrical devices 202 and 204 and the two mechanical devices 106 and 108, which do not have an electrical function, adapted to be interchangeably and releasably secured to the power supply housing 110 having conductive power contacts 112. FIG. 11 is a cross sectional view of the portable radiotelephone device 100 having a radio housing 114, the battery housing 110 and the accessory housing 1100 mechanically latched together and having conductive power contacts 1108, 1110, 112 and 1114 and conductive data signal contacts 1116, 1118, 1120 and 1122.

The portable radiotelephone device comprises a radio housing 114, a first set of conductive power contacts 1110, a power supply housing 110, a second set of conductive power contacts 1108, a third set of conductive power contacts 112, a first latch mechanism 116, an accessory housing 1100, a fourth set of conductive power contacts 1112, and a second latch mechanism 118. The radio housing 114 contains radiotelephone circuitry 1102. The first set of conductive power contacts 1110 are carried on an outer surface 120 of the radio housing 114 and electrically coupled to the radiotelephone circuitry 1102. The power supply housing 110 contains an energy source 1104. The second set of conductive power contacts 1108 and third set of conductive power contacts 112 are carried on a first outer surface 1124 and a second outer surface 1126 of the power supply housing, respectively. The second set of conductive power contacts 1108 and the third set of conductive power contacts 112 are electrically coupled to the energy source 1104.

The first latch mechanism 116 has a first portion 126 integrally formed on the outer surface 120 of the radio housing 114 and a second portion (not shown) integrally formed on the first outer surface 124 of the power supply housing 110. The first portion 126 and the second portion of the first latch mechanism 116 are adapted for releasably securing the radio housing 114 to the power supply housing 110. In the preferred embodiment, the first latch mechanism 116 is a conventional guide rail system as is well known in the art.

The second set of conductive power contacts 1108, carried on the first outer surface 1124 of the power supply housing 110, are electrically coupled to the first set of conductive power contacts 1110, carried on the outer surface 120 of the radio housing 114, to provide power to the radiotelephone circuitry 1102 when the first latch mechanism 118 secures the radio housing 114 to the power supply housing 110.

The accessory housing 1100 contains accessory circuitry 1106. The fourth set of conductive power contacts 1112 are carried on an outer surface 124 of the accessory housing 1100 and electrically coupled to the accessory circuitry 1106. The second latch mechanism 118 has a first portion 128 integrally formed on the second outer surface 1124 of the power supply housing 110 and a second portion 122 integrally formed on the outer surface 124 of the accessory housing 1100. The first portion 128 and the second portion 122 of the second latch mechanism 118 are adapted for releasably securing the power supply housing 110 to the accessory housing 1100. The fourth set of conductive power contacts 1112, carried on an outer surface 124 of the accessory housing 1100, are electrically coupled to the third set of conductive power contacts 112, carried on the second outer surface 1124 of the power supply housing 110, to provide power to the accessory circuitry 1106 when the second latch mechanism 118 secures the power supply housing 110 to the accessory housing 1100. The radio housing 114, the power supply housing 110 and the accessory housing 1100 form a single portable unit when the first latch mechanism 116 secures the radio housing 114 to the power supply housing 110 and when the second latch mechanism 118 secures the power supply housing 110 to the accessory housing 1100.

In the preferred embodiment, the first portion 128 of the second latch mechanism 118 forms a U-shaped channel partially surrounding the third set of conductive power contacts 112 on the second outer surface 124 of the power supply housing 110. The second portion 122 of the second latch mechanism 118 forms a mating U-shaped channel partially surrounding the fourth set of conductive power contacts 1112 on the outer surface 124 of the accessory housing 1100. The U-shaped channel cooperatively engages the mating U-shaped channel to secure the power supply housing 110 to the accessory housing 1100. The location of the conductive contacts in the U-shaped channel advantageously permits the conductive power contacts 112 on the power supply housing 110 to be concealed when the accessory housing 1100 is latched to the power supply housing 110.

In the preferred embodiment, the first outer surface 1124 of the power supply housing 110 is disposed essentially opposite the second outer surface 1126 of the power supply housing 110.

The accessory circuitry 1106 may be any one of the following devices: a calculator, a safety alarm shown as 202, a light shown as 102, an AM/FM radio shown as 104, a voice recorder, a display shown as 204, a modem, a printer, a camera, a pager alternatively shown as 204, and a remote controller. Therefore, the present invention provides a convenient way for a user to carry more than one device at the same time. Since the accessory device is mechanically latched to the battery housing the chance of losing or dropping the accessory device is minimized. Moreover, the user can easily interchange the types of devices carried with the portable radiotelephone depending one the user's need or present activity.

Figure 3:
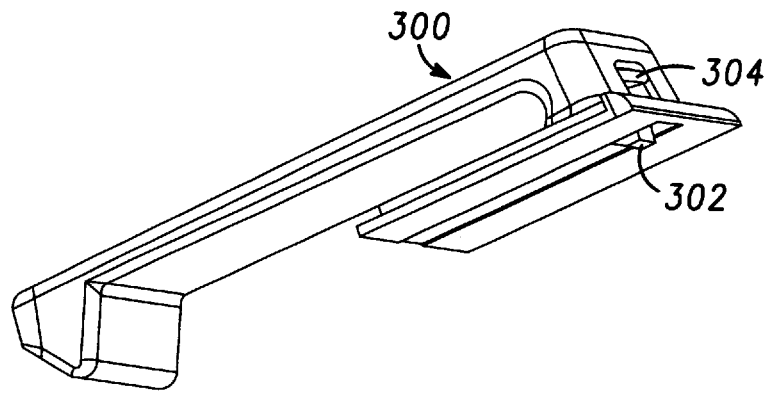
FIG. 3 is a right side, bottom side and rear side perspective view of a self-locking belt clip adapted to releasably latch to a power supply housing.
Figure 4:
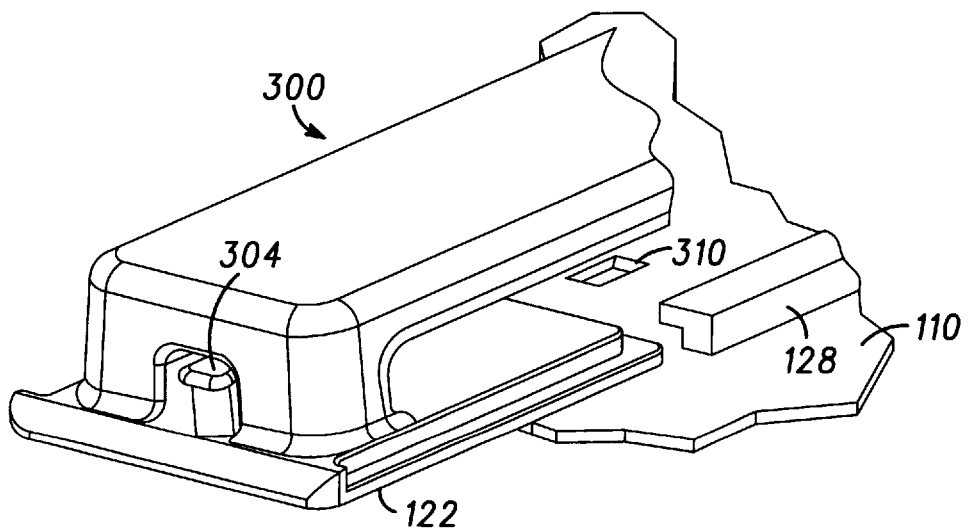
FIG. 4 is a left side, top side and rear side perspective view of the self-locking belt clip of FIG. 3 adapted to releasably latch to a power supply housing.
Figure 5:
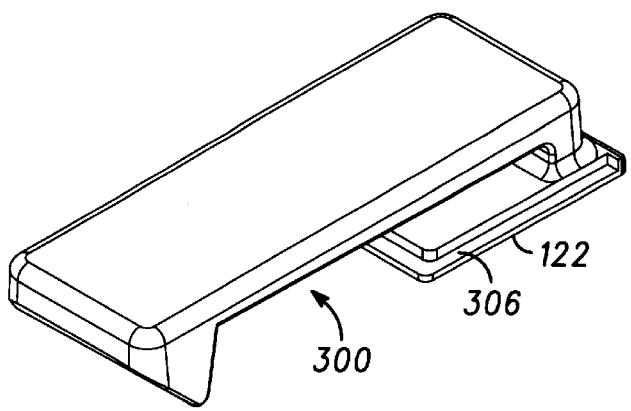
FIG. 5 is a right side, top side and front side perspective view of the self-locking belt clip of FIG. 3 adapted to releasably latch to a power supply housing.
Figure 6:
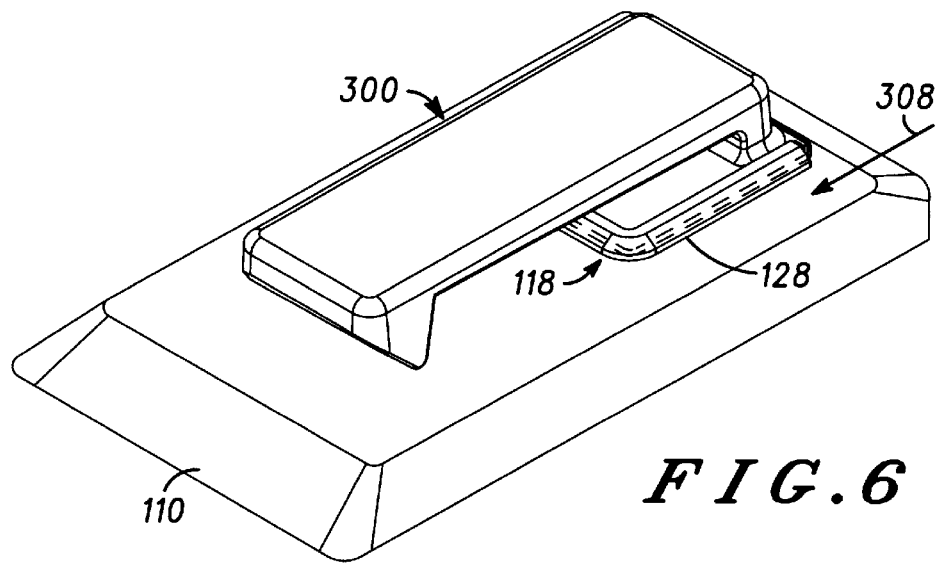
FIG. 6 is a right side, top side and front side perspective view of the self-locking belt clip of FIG. 3 secured to a power supply housing.
Figure 7:
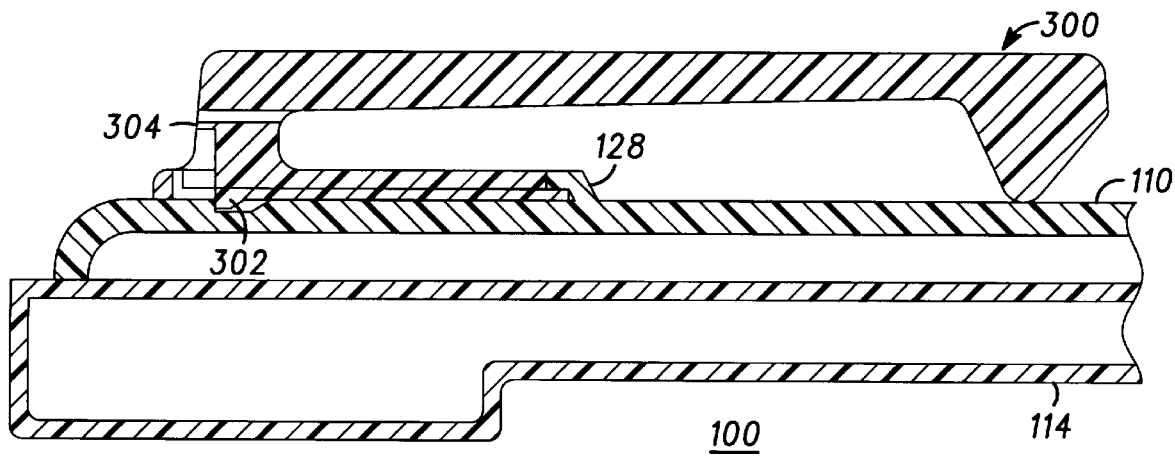
FIG. 7 is an elevation view of the self-locking belt clip of FIG. 3 secured to a power supply housing.
Figure 8:
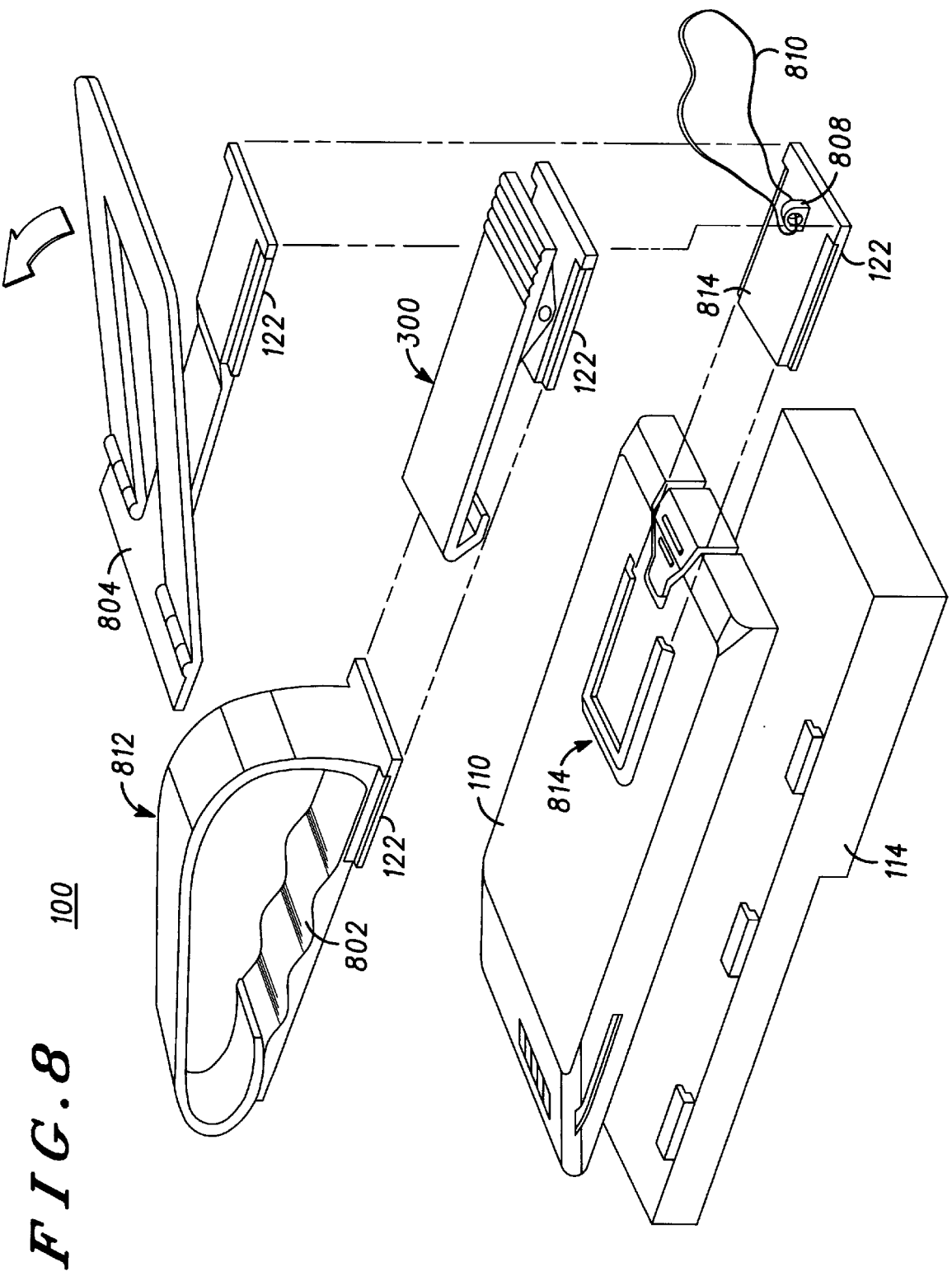
FIG. 8 is a right side, top side and rear side perspective view of a variety of mechanical devices, which do not have an electrical function, adapted to be interchangeably and releasably secured to a power supply housing.

Referring to FIGS. 3–8 together, FIG. 3 is a right side, bottom side and rear side perspective view of a self-locking belt clip 300 adapted to releasably latch to a power supply housing. FIG. 4 is a left side, top side and rear side perspective view of the self-locking belt clip 300 of FIG. 3 adapted to releasably latch to a power supply housing 110. FIG. 5 is a right side, top side and front side perspective view of the self-locking belt clip 300 of FIG. 3 adapted to releasably latch to a power supply housing 110. FIG. 6 is a right side, top side and front side perspective view of the self-locking belt clip 300 of FIG. 3 secured to a power supply housing 110. FIG. 7 is an elevation view of the portable radiotelephone device 100 including the self-locking belt clip 300 of FIG. 3 secured to a power supply housing 110. FIG. 8 is a right side, top side and rear side perspective view of the portable radiotelephone device 100 including a variety of mechanical devices 802, 804, 806 and 808, which do not have an electrical function, adapted to be interchangeably and releasably secured to a power supply housing 110.

The belt clip 300 has a locking tab 302 and a release tab 304 integrally molded with the belt clip. The power supply housing 110, also referred to as a battery housing 110, has a U-shaped channel 128 on an outer surface 124 of the power supply housing 110. The belt clip 300 has a tab 306 with a mating U-shaped channel 122 which cooperatively engages the U-shaped channel 128 on the power supply housing 110 by a sliding motion in a direction of arrow 308 to secure the belt clip 300 to the power supply housing 110. When the mating U-shaped channel 122 on the belt clip 300 is fully slid into the U-shaped channel 128 on the power supply housing 110, the locking tab 302 engages a locking recess 310 in the power supply housing 110 to secure the belt clip 300 to the power supply housing 110. To release the belt clip 300 from the power supply housing 110, the release tab 304 is pulled away from the power supply housing 110 to raise the locking tab 302 out of the locking recess 310 in the power supply housing 110. Then mating U-shaped channel 122 on the belt clip 300 is slid out of the U-shaped channel 128 on the power supply housing 110. Thus, the design of the belt clip 300 provides a simple and cost effective way of attaching the portable radiotelephone device 100 to a belt, a handbag, or an article of clothing, for example.

In the preferred embodiment, the portable radiotelephone device 100 further comprises a mechanical device represented by 812 which does not have an electrical function. The mechanical device 812 has a first portion 122 of a third latch mechanism 814, wherein first portion 122 of a third latch mechanism 814 and the first portion 122 of the second latch mechanism 118 are adapted for releasably securing the mechanical device 812 to the power supply housing 110. The mechanical device 812 and the accessory housing 1100 are adapted to be interchangeably and releasably secured to the power supply housing 110.

The mechanical device 812 comprises any one of the following items: the belt clip 300, a cover plate 814 having an eyelet 808 and a lanyard 810, a desk stand 804, a vehicular holder (not shown), and a handle 812. Each of the mechanical devices 812 shown in FIG. 8 use the latch mechanism describe in with reference to FIGS. 3–7. These mechanical devices 812 allow the user to easily handle the portable radiotelephone device 100 in a variety of circumstances and environments.

Figure 9:
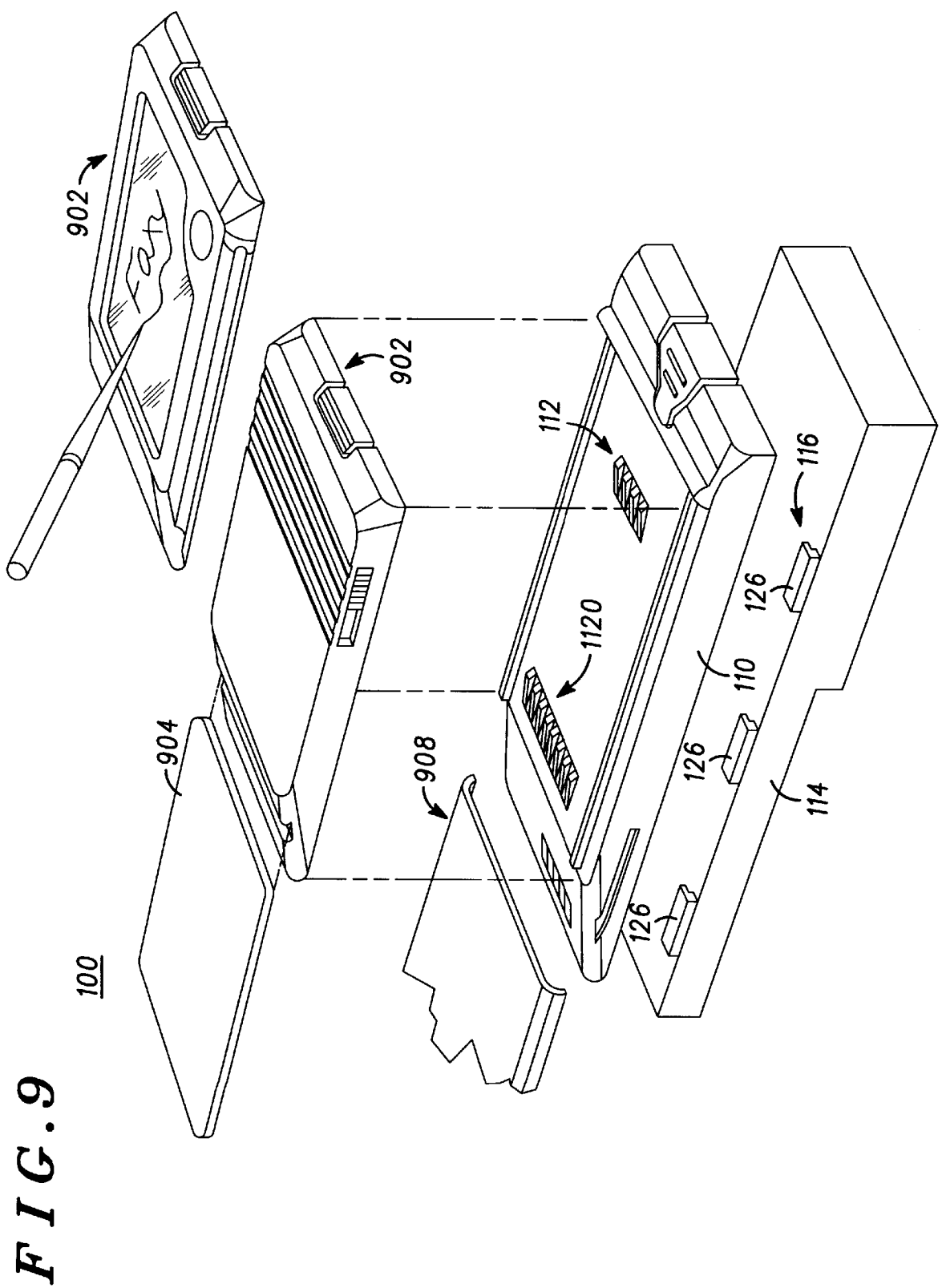
FIG. 9 is a right side, top side and rear side perspective view of two additional electrical devices and one mechanical device, which does not have an electrical function, adapted to be interchangeably and releasably secured to a power supply housing having conductive power contacts and conductive data signal contacts.
Figure 10:
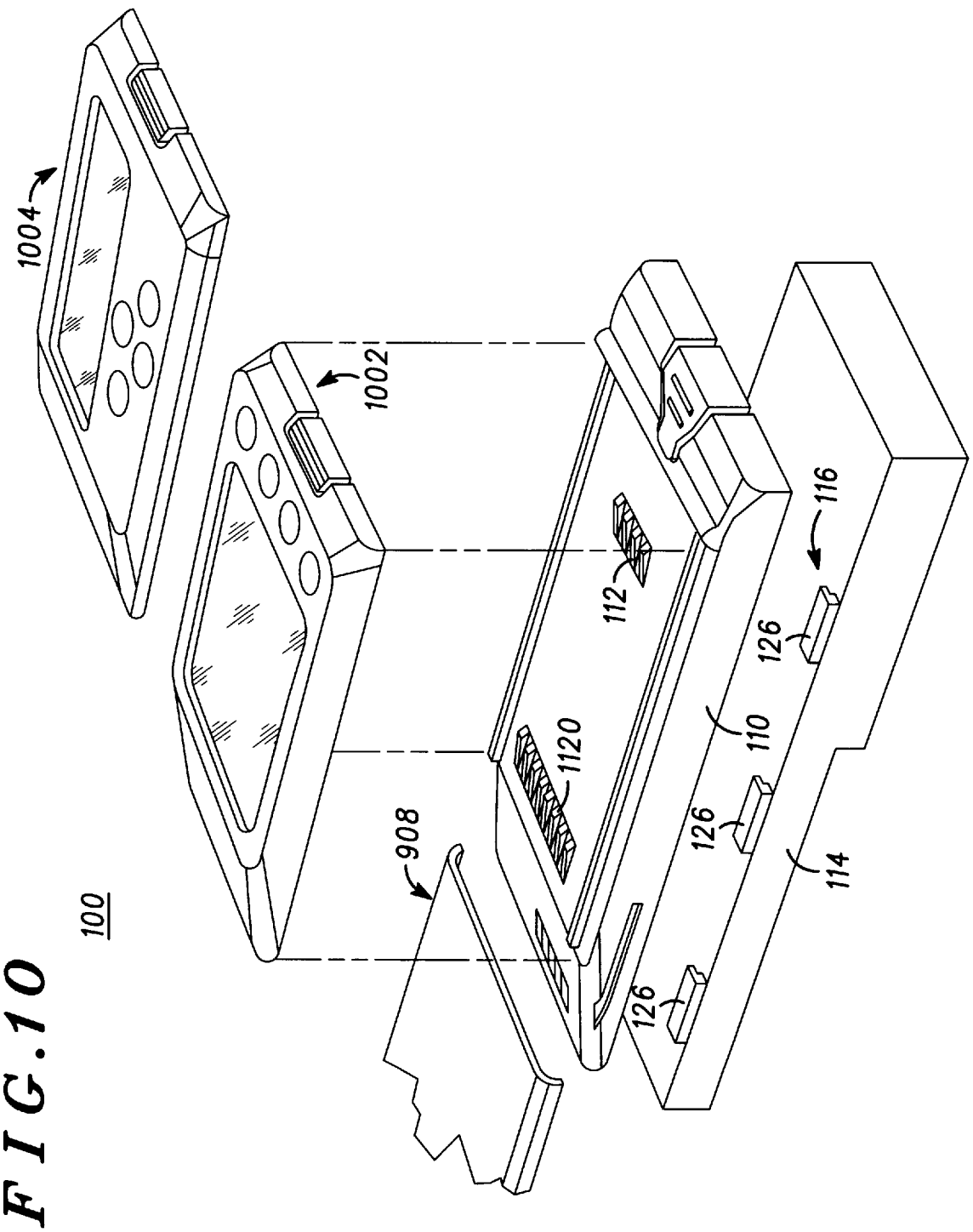
FIG. 10 is a right side, top side and rear side perspective view of two additional electrical devices and one mechanical device, which does not have an electrical function, adapted to be interchangeably and releasably secured to a power supply housing having conductive power contacts and conductive data signal contacts.

Referring to FIGS. 9, 10 and 11 together, FIG. 9 is a right side, top side and rear side perspective view of the portable telephone device 100 including three additional electrical devices 902, 904 and 906 and one mechanical device 908, which does not have an electrical function, adapted to be interchangeably and releasably secured to a power supply housing 110 having conductive power contacts 112 and conductive data signal contacts 1120. FIG. 10 is a right side, top side and rear side perspective view of the portable telephone device 100 having two additional electrical devices 1002 and 1004 and one mechanical device 1000, which does not have an electrical function, adapted to be interchangeably and releasably secured to a power supply housing 110 having conductive power contacts 112 and conductive data signal contacts 1120. FIG. 11 is a cross sectional view of the portable telephone device 100 having a radio housing 114, a power supply housing 110 and an accessory housing 1100 mechanically latched together and having conductive power contacts 1108, 1110, 112 and 1112 and conductive data signal contacts 1122, 1120, 1116 and 1118.

In an alternate embodiment, the portable radiotelephone device 100 further comprises a first set of data signal contacts, a second set of conductive data signal contacts, a third set of conductive data signal contacts, and a fourth set of conductive data signal contacts. The first set of data signal contacts 1118 are carried on the outer surface 120 of the radio housing 114 and electrically coupled to the radiotelephone circuitry 1102. The second set of conductive data signal contacts 1116 and third set of conductive data signal contacts 1120 are carried on the first outer surface 1124 and the second outer surface 1126 of the power supply housing 110, respectively. The second set of conductive data signal contacts 1116 are electrically coupled to the third set of conductive data signal contact 1120. The second set of conductive data signal contacts 1116, carried on the first outer surface 1124 of the power supply housing 110, are electrically coupled to the first set of conductive data signal contacts 1118, carried on the outer surface 120 of the radio housing 114, to permit data signals to pass between the second set of conductive data signal contacts 1116 and the third set of conductive data signal contacts 1120 and the radiotelephone circuitry 1102 when the first latch mechanism 116 secures the radio housing 114 to the power supply housing 110. The fourth set of conductive data signal contacts 1122 are carried on an outer surface 124 of the accessory housing 1100 and electrically coupled to the accessory circuitry 1106. The fourth set of conductive data signal contacts 1122, carried on an outer surface 124 of the accessory housing 1100, are electrically coupled to the third set of conductive data signal contacts 1120, carried on the second outer surface 1126 of the power supply housing 110, to permit data signals to pass between the accessory circuitry 1106 and the radiotelephone circuitry 1102 when the second latch mechanism 118 secures the power supply housing 110 to the accessory housing 1100.

The accessory circuitry 1106 comprises any one of the following devices: a display 204, controls for a personal communication system (PCS) (not shown), controls for a home security system (not shown), an emergency telephone (not shown), a global positioning satellite receiver 1004, an electronic address book 902, a video phone, a facsimile scratch pad 906, a messaging billboard 1002, a video camera via a PCMCIA camera (not shown), a memory device (not shown), and a smart card 904.

Therefore, data and control signals are permitted to be communicated between the radiotelephone circuitry and the accessory circuitry. This permits intelligent accessory devices to be mounted on the battery housing 110. This also permits intelligent exchange of information to enhance the capabilities of the radiotelephone circuitry.

In summary, the present invention permits a portable radiotelephone device 100 having a battery housing attached to receive on the battery housing a wide variety of electrical and mechanical accessory devices to enhance the effectiveness and capabilities of the portable radiotelephone device 100.

What is claimed is:

1. A portable radiotelephone device comprising:

a radio housing containing radiotelephone circuitry;

a first set of conductive power contacts being carried on an outer surface of the radio housing and electrically coupled to the radiotelephone circuitry;

a power supply housing containing an energy source;

a second set of conductive power contacts and a third set of conductive power contacts being carried on a first outer surface and a second outer surface of the power supply housing, respectively, wherein the second set of conductive power contacts and the third set of conductive power contacts are electrically coupled to the energy source;

a first latch mechanism having a first portion integrally formed on the outer surface of the radio housing and a second portion integrally formed on the first outer surface of the power supply housing, wherein the first portion and the second portion of the first latch mechanism are adapted for releasably securing the radio housing to the power supply housing, and wherein the second set of conductive power contacts, carried on the first outer surface of the power supply housing, are electrically coupled to the first set of conductive power contacts, carried on the outer surface of the radio housing, to provide power to the radiotelephone circuitry when the first latch mechanism secures the radio housing to the power supply housing;

an accessory housing containing accessory circuitry;

a fourth set of conductive power contacts being carried on an outer surface of the accessory housing and electrically coupled to the accessory circuitry; and a second latch mechanism having a first portion integrally formed on the second outer surface of the power supply housing and a second portion integrally formed on the outer surface of the accessory housing, wherein the first portion and the second portion of the second latch mechanism are adapted for releasably securing the power supply housing to the accessory housing, and wherein the fourth set of conductive power contacts, carried on an outer surface of the accessory housing, are electrically coupled to the third set of conductive power contacts, carried on the second outer surface of the power supply housing, to provide power to the accessory circuitry when the second latch mechanism secures the power supply housing to the accessory housing, wherein the radio housing, the power supply housing and the accessory housing form a single portable unit when the first latch mechanism secures the radio housing to the power supply housing and when the second latch mechanism secures the power supply housing to the accessory housing.

2. A portable radiotelephone device according to claim 1:

wherein the first portion of the second latch mechanism forms a U-shaped channel partially surrounding the third set of conductive power contacts on the second outer surface of the power supply housing, wherein the second portion of the second latch mechanism forms a mating U-shaped channel partially surrounding the fourth set of conductive power contacts on the outer surface of the accessory housing, and wherein the U-shaped channel cooperatively engages the mating U-shaped channel to secure the power supply housing to the accessory housing.

3. A portable radiotelephone device according to claim 1 wherein the first outer surface of the power supply housing is disposed essentially opposite the second outer surface of the power supply housing.

4. A portable radiotelephone device according to claim 1 wherein the accessory circuitry comprises at least one of: a calculator, a safety alarm, a light, an AM/FM radio, a voice recorder, a display, a modem, a printer, a camera, a pager, and a remote controller.

5. A portable radiotelephone device according to claim 1 further comprising:

a mechanical device which does not have an electrical function, wherein the mechanical device has a first portion of a third latch mechanism, wherein first portion of a third latch mechanism and the first portion of the second latch mechanism are adapted for releasably securing the mechanical device to the power supply housing, and wherein the mechanical device and the accessory housing are adapted to be interchangeably and releasably secured to the power supply housing.

6. A portable radiotelephone device according to claim 5 wherein the mechanical device comprises at least one of: a belt clip, a cover plate, a cover plate having an eyelet and a lanyard, a desk stand, a vehicular holder, and a handle.

7. A portable radiotelephone device according to claim 1 further comprising:

a first set of data signal contacts carried on the outer surface of the radio housing and electrically coupled to the radiotelephone circuitry;

a second set of conductive data signal contacts and a third set of conductive data signal contacts a carried on the first outer surface and the second outer surface of the power supply housing, respectively, wherein the second set of conductive data signal contacts are electrically coupled to the third set of conductive data signal contacts;

wherein the second set of conductive data signal contacts, carried on the first outer surface of the power supply housing, are electrically coupled to the first set of conductive data signal contacts, carried on the outer surface of the radio housing, to permit data signals to pass between the second set of conductive data signal contacts and the third set of conductive data signal contacts and the radiotelephone circuitry when the first latch mechanism secures the radio housing to the power supply housing; and a fourth set of conductive data signal contacts being carried on an outer surface of the accessory housing and electrically coupled to the accessory circuitry;

wherein the fourth set of conductive data signal contacts, carried on an outer surface of the accessory housing, are electrically coupled to the third set of conductive data signal contacts, carried on the second outer surface of the power supply housing, to permit data signals to pass between the accessory circuitry and the radiotelephone circuitry when the second latch mechanism secures the power supply housing to the accessory housing.

8. A portable radiotelephone device according to claim 7 wherein the accessory circuitry comprises at least one of: a display, controls for a personal communication system (PCS), controls for a home security system, an emergency telephone, a global positioning satellite receiver, an electronic address book, a video phone, a facsimile scratch pad, a video camera via a PCMCIA camera, and a memory device.

9. A portable radiotelephone device comprising:

a radio housing containing radiotelephone circuitry;

a first set of conductive power contacts being carried on an outer surface of the radio housing and electrically coupled to the radiotelephone circuitry;

a power supply housing containing an energy source;

a second set of conductive power contacts and a third set of conductive power contacts being carried on a first outer surface and a second outer surface of the power supply housing, respectively, wherein the first outer surface of the power supply housing is disposed essentially opposite the second outer surface of the power supply housing, and wherein the second set of conductive power contacts and the third set of conductive power contacts are electrically coupled to the energy source;

a first latch mechanism having a first portion integrally formed on the outer surface of the radio housing and a second portion integrally formed on the first outer surface of the power supply housing, wherein the first portion and the second portion of the first latch mechanism are adapted for releasably securing the radio housing to the power supply housing, and wherein the second set of conductive power contacts, carried on the first outer surface of the power supply housing, are electrically coupled to the first set of conductive power contacts, carried on the outer surface of the radio housing, to provide power to the radiotelephone circuitry when the first latch mechanism secures the radio housing to the power supply housing;

an accessory housing containing accessory circuitry;

a fourth set of conductive power contacts being carried on an outer surface of the accessory housing and electrically coupled to the accessory circuitry; and a second latch mechanism having a first portion integrally formed on the second outer surface of the power supply housing and a second portion integrally formed on the outer surface of the accessory housing, wherein the first portion of the second latch mechanism forms a U-shaped channel partially surrounding the third set of conductive power contacts on the second outer surface of the power supply housing, wherein the second portion of the second latch mechanism forms a mating U-shaped channel partially surrounding the fourth set of conductive power contacts on the outer surface of the accessory housing, wherein the U-shaped channel of the first portion is adapted for cooperative engagement with the mating U-shaped channel of the second portion to releasably secure the power supply housing to the accessory housing, wherein the fourth set of conductive power contacts, carried on an outer surface of the accessory housing, are electrically coupled to the third set of conductive power contacts, carried on the second outer surface of the power supply housing, to provide power to the accessory circuitry when the second latch mechanism secures the power supply housing to the accessory housing, wherein the radio housing, the power supply housing and the accessory housing form a single portable unit when the first latch mechanism secures the radio housing to the power supply housing and when the second latch mechanism secures the power supply housing to the accessory housing.

10. A portable radiotelephone device according to claim 9 wherein the accessory circuitry comprises at least one of: a calculator, a safety alarm, a light, an AM/FM radio, a voice recorder, a display, a modem, a printer, a camera, a pager, and a remote controller.

11. A portable radiotelephone device according to claim 9 further comprising:

a mechanical device which does not have an electrical function, wherein the mechanical device has a first portion of a third latch mechanism, wherein first portion of a third latch mechanism and the first portion of the second latch mechanism are adapted for releasably securing the mechanical device to the power supply housing, and wherein the mechanical device and the accessory housing are adapted to be interchangeably and releasably secured to the power supply housing.

12. A portable radiotelephone device according to claim 9 wherein the mechanical device comprises at least one of: a belt clip, a cover plate, a cover plate having an eyelet and a lanyard, a desk stand, a vehicular holder, and a handle.

13. A portable radiotelephone device according to claim 9 further comprising:

a first set of data signal contacts being carried on the outer surface of the radio housing and electrically coupled to the radiotelephone circuitry;

a second set of conductive data signal contacts and a third set of conductive data signal contacts being carried on the first outer surface and the second outer surface of the power supply housing, respectively, wherein the second set of conductive data signal contacts are electrically coupled to the third set of conductive data signal contacts;

wherein the second set of conductive data signal contacts, carried on the first outer surface of the power supply housing, are electrically coupled to the first set of conductive data signal contacts, carried on the outer surface of the radio housing, to permit data signals to pass between the second set of conductive data signal contacts and the third set of conductive data signal contacts and the radiotelephone circuitry when the first latch mechanism secures the radio housing to the power supply housing; and a fourth set of conductive data signal contacts being carried on an outer surface of the accessory housing and electrically coupled to the accessory circuitry;

wherein the fourth set of conductive data signal contacts, carried on an outer surface of the accessory housing, are electrically coupled to the third set of conductive data signal contacts, carried on the second outer surface of the power supply housing, to permit data signals to pass between the accessory circuitry and the radiotelephone circuitry when the second latch mechanism secures the power supply housing to the accessory housing.

14. A portable radiotelephone device according to claim 13 wherein the accessory circuitry comprises at least one of: a display, controls for a personal communication system (PCS), controls for a home security system, an emergency telephone, a global positioning satellite receiver, an electronic address book, a video phone, a facsimile scratch pad, a video camera via a PCMCIA camera, a memory device.

15. A portable radiotelephone device comprising:

a radio housing containing radiotelephone circuitry;

a first set of conductive power contacts being carried on an outer surface of the radio housing and electrically coupled to the radiotelephone circuitry;

a power supply housing containing an energy source;

a second set of conductive power contacts and a third set of conductive power contacts being carried on a first outer surface and a second outer surface of the power supply housing, respectively, wherein the second set of conductive power contacts and the third set of conductive power contacts are electrically coupled to the energy source;

a first latch mechanism having a first portion integrally formed on the outer surface of the radio housing and a second portion integrally formed on the first outer surface of the power supply housing, wherein the first portion and the second portion of the first latch mechanism are adapted for releasably securing the radio housing to the power supply housing, and wherein the second set of conductive power contacts, carried on the first outer surface of the power supply housing, are electrically coupled to the first set of conductive power contacts, carried on the outer surface of the radio housing, to provide power to the radiotelephone circuitry when the first latch mechanism secures the radio housing to the power supply housing;

an accessory housing containing accessory circuitry;

a fourth set of conductive power contacts being carried on an outer surface of the accessory housing and electrically coupled to the accessory circuitry;

a second latch mechanism having a first portion integrally formed on the second outer surface of the power supply housing and a second portion integrally formed on the outer surface of the accessory housing, wherein the first portion and the second portion of the second latch mechanism are adapted for releasably securing the power supply housing to the accessory housing, and wherein the fourth set of conductive power contacts, carried on an outer surface of the accessory housing, are electrically coupled to the third set of conductive power contacts, carried on the second outer surface of the power supply housing, to provide power to the accessory circuitry when the second latch mechanism secures the power supply housing to the accessory housing;

a first set of data signal contacts being carried on the outer surface of the radio housing and electrically coupled to the radiotelephone circuitry;

a second set of conductive data signal contacts and third set of conductive data signal contacts a carried on the first outer surface and the second outer surface of the power supply housing, respectively, wherein the second set of conductive data signal contacts are electrically coupled to the third set of conductive data signal contacts, and wherein the second set of conductive data signal contacts, carried on the first outer surface of the power supply housing, are electrically coupled to the first set of conductive data signal contacts, carried on the outer surface of the radio housing, to permit data signals to pass between the second set of conductive data signal contacts and the third set of conductive data signal contacts and the radiotelephone circuitry when the first latch mechanism secures the radio housing to the power supply housing; and a fourth set of conductive data signal contacts being carried on an outer surface of the accessory housing and electrically coupled to the accessory circuitry, wherein the fourth set of conductive data signal contacts, carried on an outer surface of the accessory housing, are electrically coupled to the third set of conductive data signal contacts, carried on the second outer surface of the power supply housing, to permit data signals to pass between the accessory circuitry and the radiotelephone circuitry when the second latch mechanism secures the power supply housing to the accessory housing, wherein the radio housing, the power supply housing and the accessory housing form a single portable unit when the first latch mechanism secures the radio housing to the power supply housing and when the second latch mechanism secures the power supply housing to the accessory housing.

16. A portable radiotelephone device according to claim 15:

wherein the first portion of the second latch mechanism forms a U-shaped channel partially surrounding the third set of conductive power contacts on the second outer surface of the power supply housing, wherein the second portion of the second latch mechanism forms a mating U-shaped channel partially surrounding the fourth set of conductive power contacts on the outer surface of the accessory housing, and wherein the U-shaped channel cooperatively engages the mating U-shaped channel to secure the power supply housing to the accessory housing.

17. A portable radiotelephone device according to claim 15 wherein the first outer surface of the power supply housing is disposed essentially opposite the second outer surface of the power supply housing.

18. A portable radiotelephone device according to claim 15 wherein the accessory circuitry comprises at least one of: a calculator, a safety alarm, a light, an AM/FM radio, a voice recorder, a display, a modem, a printer, a camera, a pager, and a remote controller.

19. A portable radiotelephone device according to claim 15 further comprising:

a mechanical device which does not have an electrical function, wherein the mechanical device has a first portion of a third latch mechanism, wherein first portion of a third latch mechanism and the first portion of the second latch mechanism are adapted for releasably securing the mechanical device to the power supply housing, and wherein the mechanical device and the accessory housing are adapted to be interchangeably and releasably secured to the power supply housing.

20. A portable radiotelephone device according to claim 19 wherein the mechanical device comprises at least one of the following: a belt clip, a cover plate, a cover plate having an eyelet and a lanyard, a desk stand, a vehicular holder, and a handle.

* * * * *